United States Patent Office 3,332,965
Patented July 25, 1967

3,332,965
PROCESS FOR OXIDIZING PROPYLENE
Kenichi Fukui, Sakyo-ku, Kyoto, Tsutomu Kagiya and Takeo Shimidzu, Fushimi-ku, Kyoto, Hirohisa Kataoka, Suita-shi, Osaka-fu, Masasuke Aimi, Takatsuki-shi, Osaka-fu, Shinji Nose, Masao Miyamae, and Tetsuya Nakata, Amagasaki-shi, Hyogo-ken, and Shiniti Takayama, Nishinomiya-shi, Hyogo-ken, Japan, assignors to Osaka Soda Co., Ltd., Osaka, Japan, a corporation of Japan
No Drawing. Filed Apr. 24, 1963, Ser. No. 275,198
Claims priority, application Japan, May 2, 1962, 37/18,036; Dec. 5, 1962, 37/54,656; Dec. 13, 1962, 37/56,679
4 Claims. (Cl. 260—348.5)

This invention relates to a process for oxidizing propylene in which propylene oxide can be produced by a direct process from a mixed gas comprising propylene and oxygen even under normal atmospheric pressure, the process being one which produces with advantage selectively and in good yield the commercially important propylene oxide, acetoaldehyde and acrolein as the chief products with the formation of such undesirable by-products as carbon oxides and formaldehyde being relatively insignificant. More particularly, the invention relates to a process for oxidizing propylene which is characterized in that the direct oxidation thereof is effected by contacting a mixed gas comprising at least propylene and oxygen with at least one catalyst selected from the group consisting of (a) the compounds represented by the general formula (1)          $R_nSiX_{4-n}$ wherein $n$ is a positive integer of 0, 1, 2, 3 or 4, R is at least one member selected from hydrogen, alkyl, halogenated alkyl, alkoxy, aryl, alkenyl, carboxyl and hydroxyl groups, and X is halogens or the hydroxyl group; (b) polymers thereof; (c) silica and (d) silicates.

Heretofore, it is known that propylene oxide, acetoaldehyde, acrolein and other substances were formed by the direct oxidation reaction of propylene. Of the foregoing substances, while acrolein is formed when a catalyst consisting chiefly of copper is used, propylene oxide has not yet been obtained by the direct oxidation reaction under normal atmospheric pressure. Although in recent years great strides are being made in the researches concerning the direct oxidation process of olefins, it has already been reported as a result of researches in which various classes of catalysts were used that propylene oxide in appreciable quantities cannot be obtained by the vapor phase catalytic oxidation reaction thereof.

On the other hand, it is hardly necessary to mention that propylene oxide owing to its great reactivity is of very great importance as the starting material of various industrial products obtained by the addition reaction or the polymerization reaction thereof. However, as to the process for its manufacture, the principal one is the so-called chlorohydrin process which is a complicated and expensive process. Although the demand by the industry is for the development of a direct oxidation process, up to date, no satisfactory process has been found.

As a result of having researched for a commercially advantageous and effective process for producing selectively as the chief products propylene oxide, acetoaldehyde and acrolein by means of such a direct oxidation process of propylene, particularly by means of the catalytic oxidation reaction of propylene, we found that the silicon or tin compounds represented by the foregoing Formula 1 or the polymers thereof had a favorable catalytic activity with respect to the direct oxidation reaction of propylene and that by carrying out the reaction using such a compound or polymer in at least one of the phases thereof consisting of the solid, vapor, solution and slurry phases, the commercial production of propylene oxide by the direct oxidation process capable of satisfying the aforementioned demands of industry could be effectively achieved with advantage.

It was also found that the oxygen in the material mixed gas could be an oxygen-containing gas, for example, air; that the mixed gas could be diluted with a diluent gas such as, for example, carbon dioxide, carbon monoxide, nitrogen, steam, benzene, etc.; that it was also possible to add a small amount of saturated and unsaturated hydrocarbons; and hence that any and all mixed gases comprising propylene and oxygen could be used so long as the catalytic activity of the gas was not particularly impaired.

We also found that the reaction was satisfactorily carried out under conditions of normal atmospheric pressure and that by incorporating in the reaction system as additives aldehydes, ketones and alcohols such as formaldehyde, acetoaldehyde, propylaldehydes, acrolein, butylaldehydes, acetone, methanol, ethanol, propanols, butanols, etc., the reaction speed and/or selectively could be improved still further.

It is therefore an object of this invention to provide a process for producing by a direct oxidation method propylene oxide which could not be produced by the hitherto commercially utilizable direct oxidation processes.

Another object of the invention is to provide a process for oxidizing propylene wherein propylene oxide can be produced by the direct process even under normal atmospheric pressure while the formation of undesirable by-products such as carbon oxides, formaldehyde, etc., are restrained, whereby it becomes possible to produce with advantage selectively and in good yield propylene oxide, acetoaldehyde and acrolein as the chief products.

A further object of this invention is to disclose a catalyst having useful catalytic activity when used in such a direct oxidation process and a method of preparing such a catalyst.

Other objects nad advantages of the present invention will be apparent from the following description thereof.

The catalyst used in the process of this invention is at least one catalyst selected from the group consisting of (a) the compounds represented by the aforementioned Formula 1, i.e., (1)          $R_nSiX_{4-n}$ wherein $n$ is a positive integer of 0, 1, 2, 3 or 4, R is at least one member selected from hydrogen, alkyl, halogenated alkyl, alkoxy, aryl, alkenyl, carboxyl and hydroxyl groups, and X is halogens or the hydroxyl group; (b) polymers thereof; (c) silica and (d) silicates; which may be used singly or in combinations.

When R and/or X in the aforementioned Formula 1 is 2, or more than 2, R and/or X may each be the same class of atoms of groups or may also be atoms or groups of a different class.

Further, as the alkyl groups of the R in the aforementioned Formula 1, included are the aliphatic alkyl groups such as for example, methyl, ethyl, propyl, butyl, etc.; as the halogenated alkyls, the halogenated alkyls such as, for example, chloromethyl, 1,2-dichlorovinyl, p-bromophenyl, p-chlorophenyl, etc.; as the alkoxy groups, groups such as, for example, methoxy, iso-propoxy, n-propoxy, allyloxy, butoxy, glycoxy, benzyloxy, etc.; as the aryl groups, groups such as, for example, phenyl, tolyl, xylyl, benzyl, napthyl, etc.; as the alkenyl groups, groups such as, for example, vinyl, allyl, etc.; as the carboxyl groups, groups such as, for example, acetoxyl, propoxyl, etc.

Hence, the compounds and polymers used in this invention as substances possessing catalytic activity include a wide range of inorganic and organic silicon and tin compounds, which may be used singly or in combinations. These compounds or polymers cover a wide range of gases, liquids and solids.

A number of illustrations will be given below of catalysts which can be used in the process of this invention.

As the above inorganic silicon compounds, mention may be made of the inorganic silanes, siliconhalides and the silicon esters and ethers.

Included as such compounds are, for example, the silanes such as silane ($SiH_4$), monochlorosilane, dichlorosilane, trichlorosilane, monobromosilane, dibromosilane, trifluorosilane, etc.; the siliconhalides such as silicon tetrafluoride, silicon tetrachloride, silicon tetrabromide, silicon tetraiodide, etc.; and the silicon esters and ethers such as silicon monoethylmonohydrodiacetate, silicon monoethyltriacetate, silicon trimethyl acetate, silicon monoethyl triacetate, silicon diethyl diacetate, silicon triethylacetate, silicon triphenyl acetate, silicon tetraacetate, silicon tetrapropionate, methyl orthosilicate, ethyl orthosilicate, n-propil orthosilicate, isopropil orthosilicate, allyl orthosilicate, propyleneglycol orthosilicate, n-butyl orthosilicate, iso-butyl orthosilicate, benzyl orthosilicate, dimethyldiethoxysilane, ethyltriethoxysilane, amyltriethoxysilane, vinyltriethoxysilane, etc.

And, as the organic silicon compounds can be named the alkyl, alkenyl and aryl derivatives of silanes, organohalogenosilanes, organosilanols, etc.

As such compounds, included are the alkyl, alkenyl and aryl derivatives of silanes such as, for example, tetramethylsilane, trimethylethylsilane, dimethyldiethylsilane, methyl triethylsilane, tetraethylsilane, diethyldiphenylsilane, tetra-n-propilsilane, tetra-n-butylsilane, tetra-n-amylsilane, tetra-iso-amylsilane, tetraphenylsilane, tetrabenzylsilane, tetra-m-tolysilane, tetra-p-naphthylsilane, triethyl vinylsilane, etc.; the organohalogenosilanes such as, for example, methyl trifluorosilane, dimethyl difluorosilane, trimethyl fluorosilane, ethyl vinyldichlorosilane, ethyl hydrodichlorosilane, methyl hydrodichlorosilane, triethylchlorosilane, methyl tribromosilane, dimethyldibromosilane, dimethyldichlorosilane, diethyldichloro silane, trimethylchlorosilane, trimethylbromosilane, diphenyldichlorosilane, diphenyldibromosilane, triphenylchlorosilane, methyltrichlorosilane, vinyltrichlorosilane, ethyltrichlorosilane, allyltrichlorosilane, gamma - chloropropenyl trichlorosilane, n-propiltrichlorosilane, n-butyltrichlorosilane, amyltrichlorosilane, phenyltrichlorosilane, chlorobenzenetrichlorosilane, dichlorobenzenetrichlorosilane, cyclohexenyltrichlorosilane, cyclohexyltrichlorosilane, lauryltrichlorosilane, dioctyltrichlorosilane, octadecyltrichlorosilane, alpha - naphthyltrichlorosilane, etc.; and the organosilanols such as, for example, triethylsilanol, dimethyldichloromethylsilanol, methylethylphenylsilanol, triethylsilanol, diethyldihydroxysilane, diethylphenylsilanol, tri-n-propilsilanol, di - n - propildihydroxysilane, di-n-butyl-dihydroxysilane, tri-isoamylsilanol, triphenylsilanol, diphenyldihydroxysilane, tricyclohexylsilane, tricyclohexylsilanol, etc.

It is also possible according to the process of this invention to use in like manner the polymers of the aforementioned compounds as well as the silicic acid and silicate polymers.

While the compounds having hydroxy, halogen, hydrogen, alkoxy and carboxy of the aforementioned compounds form polymers containing

by hydrolytic condensation polymerization and/or condensation polymerization, it is to be understood that that are referred to as polymers in this invention comprehend such condensation polymers.

As such polymers there can be mentioned the silica, silicates and the organopolysiloxanes which include the linear organopolysiloxanes, cyclic organopolysiloxanes and alkoxypolysiloxanes.

For example, the inorganic silanes such as silane and monochlorosilane; the silicon halides such as tetrafluorosilan; the tetracarboxy silicon esters such as silicon tetraacetate and silicon tetrapropionate; and the tetraalkoxy silicon esters such as ethylorthosilicate, and n-propilorthosilicate form silicas as polymers by means of the hydrolytic condensation polymerization. Hence, it goes without saying that the polymers to be utilized as catalysts in the process of this invention include, besides the activated silicas obtained by activating the foregoing silicas, the activated silicas obtained by activating the natural silicas. Further, it is to be understood that also included are the activated silicas obtained by activating silicas which are polymers of ortho silicic acid and meta silicic acid.

As the organopolysiloxanes, there can be mentioned the polymers such as, for example, dimethylpolysiloxane and methylphenylpolysiloxane obtained by the hydrolytic condensation polymerization of organohalogenosilanes such as dimethyldichlorosilane and methylphenyldichlorosilane; hexamethyldisiloxane and diethylpolysiloxane obtained by the condensation polymerization of organosilanol such as trimethylsilanol and diethyldihydroxysilane; dimethylpolysiloxane and hexamethyldisiloxane obtained by the hydrolytic condensation polymerization of silicon esters such as silicon diethyldiacetate and silicon triethylacetate; dimethylpolysiloxane and ethylpolysiloxane obtained by the hydrolytic condensation polymerization of silicon esters such as dimethyldiethoxysilane and ethyltriethoxysilane; the partially ethoxylated polysiloxane and ethyl-partially ethoxylated polysiloxane obtained by the partially hydrolytic condensation polymerization of ethylorthosilicate and ethyltriethoxysilane; etc. The foregoing is, of course, merely an illustration of a number of examples, it being understood that the polymers to be utilized in the present invention comprehend the numerous polymers of the compounds represented by the general formula already set forth hereinbefore.

The silicas and silicates, as already mentioned herein, are, in all cases, those which have been activated. This activation may be accomplished, for instance, either by reacting the alkyl silicates such as ethyl silicate and propyl silicate with an inorganic or organic acid in a polar solvent of said alkyl silicates, i.e., a solution thereof in, for example alcohols, polyhydric alcohols, ethers, etc., to effect conversion to partially alkylated polysiloxanes or by a physical means such as irradiation with an ionizing radiation and heating at elevated temperatures.

In this case, the activation of the silicas other than the natural silicas is conveniently effected by preheating at a temperature above about 1300° C. In the case of silicates and natural silica, the activation can be fully accomplished at lower temperatures. For example, quartz can be activated at a temperature of less than about 700° C., normally of the order of 600° C. Moreover, when such a silica is first treated with hydrogen fluoride and then preheated, it can be activated even at a temperature on the order of about 400° C. On the other hand, as the ionizing radiation, conveniently utilizable are the ionizing radiant rays such as, for example, X, alpha, beta and gamma rays. Again, the silicates such as silica glass as well as the various types of glasses which are regarded as being silica glass wherein are contained various impurities may also be used as catalysts by means of the same treatment. This fact comprehends the featured principle that in carrying out the reaction according to this invention it is particularly desirable that a reactor made of either quartz or glass be employed.

Although the description so far has been regarding the instance when the M in the foregoing Formula 1 is a catalytic substance of the silicon type, it is also the same in the case when M is tin. And as such substances, included are, for example, tin tetrahydride, stannic chloride, stannic bromide, stannic iodide, stannic acetate, di-n-butyl tin diacetate, tetraphenyl tin, tetramethyl tin, diethyldichlorotin, dipropyldichlorotin, monobutyltrichlorotin, dibutyldichlorotin, diphenyldichlorotin, triethylhydroxytin, triphenylhydroxytin, tributylbutoxytin, tetrabutoxytin, triethyltinoxide, dibutyltinoxide, triethyl tin acetate, tin (IV) ethoxide, tin (IV) propoxide, tin (IV) isopropoxide, tin (IV) N-butyloxide and the polymers thereof, etc.

The catalytic substances to be used in the process of this invention cover a wide range of gases, liquids and solids, which may be used alone or in suitable combinations. In addition, these catalysts may be mixed with other inert gases, dissolved in a suitable solvent, suspended in a nonsolvent or supported on a suitable solid carrier and used in at least one of the states of either a solid, gaseous, liquid or slurry phase.

The foregoing inert gases include, for example, nitrogen, helium, air, carbon dioxide, etc., while as the solid carriers usable are the natural or artificial materials such as silica glass, borosilicate glass, rock crystal, silica gel, kieselguhr, pumice, kaolinite, active carbon, porcelain, etc. In effecting the support of the catalyst on such a carrier, it can be accomplished by contacting a catalyst gas with said carriers, or the catalyst gas can be dissolved in a suitable solvent, for example, an organic solvent such as heptane, benzene, etc., and then be used as a liquid phase catalyst. On the other hand, when the catalyst is a liquid, it can be used, as such, as a liquid phase catalyst, or it can be impregnated in a solid carrier, as mentioned above, and used while being supported thereby. When the catalyst is a solid, it can be used as such or it can be dissolved or suspended in a suitable solvent or nonsolvent and used in a liquid or slurry phase. Alternatively, these solutions or slurries can be supported on a solid carrier and used in this state. To effect the support on such a solid carrier, the catalyst is normally used as a solution or slurry having a concentration of usually of the order of 0.01% to 50% by weight, and in most cases of 0.01% to 10% by weight.

Further, when the catalyst is a substance capable of being polymerized, the catalyst is conveniently formed by being polymerized on the carrier. For example, in the case of organo silicon compounds containing halogens or hydroxyl groups, such as dimethyldichlorosilane and dimethylsilanol, the polymeric catalyst can be formed on the carrier by impregnation into or contacting with a solid carrier and effecting the hydrolytic condensation polymerization and/or condensation polymerization.

As already stated hereinabove, it is an advantage to use the silicas and silicates which have received the activation treatment.

Again, in the case of silica gel, that which has been preheated at above 600° C. under a reduced pressure of the order of $10^{-1}$–$10^{-10}$ mm. Hg can be used as the carrier. In this case, it is also possible to incorporate in the silica gel minute amounts of inorganic acids, metallic salts thereof and organic metallic salts such as, for example, manganese acetate, ferrous hydroxide, silver nitrate, ferrous oxalate, boric acid, etc., which may then be used without further treatment or after development of catalytic activity by preheating at a relatively low temperature. The amount added of these substances in minute amounts is preferably in the order $10^{-6}$–$10^{-1}$ moles per each silicon atom.

According to the process of this invention, in which the reaction is carried out in the presence of a catalyst, the amount used of the catalyst may vary over a very wide range. Although normally the objects of the invention are fully attained with a very minute amount, a large amount such as several tens of percent per hour is also usable. The amount to be used can be varied over a wide range depending on such as the form and class of the catalysts, the combinations thereof employed, the intended chief products, the reaction conditions, etc.

The reaction can be carried out without regard to the catalyst phase, it being possible either to carry out the reaction by means of the catalytic oxidation process in the vapor phase by contacting the material propylene in its vapor phase with the catalyst phase, or also to carry out the reaction by means of the catalytic oxidation reaction in the liquid phase by contacting the material propylene in its liquid phase with the catalyst phase under conditions of normal atmospheric pressure or application of pressure. One of the important features of the process of this invention lies particularly in the fact that the reaction can be carried out under normal atmospheric pressure.

The vapor phase reaction can be carried out by effecting the vapor phase catalytic oxidation of the material propylene and oxygen or an oxygen-containing gas in their gaseous state in the presence of a catalyst selected from the group consisting of a vapor phase, liquid phase, slurry phase and solid phase catalysts under conditions of a temperature of from about 200° to 800° C. and a pressure of from normal atmospheric pressure to about 10 atmospheres.

On the other hand, the liquid phase reaction can be carried out by effecting the liquid phase catalytic oxidation under the conditions of a temperature of from 100° to 300° C. and a pressure of from normal atmospheric pressure to about 70 atmospheres in the presence of a catalyst selected from the group consisting of solution phase, slurry phase and vapor phase catalysts, the presence of catalyst being accomplished by dissolving the material propylene and oxygen or a oxygen-containing gas in a suitable solvent such as, say, benzene, toluene, etc., and then by either blowing thereinto a vapor phase catalyst, or incorporating therein a liquid phase or slurry phase catalyst, or by adding a solid phase catalyst thereto to form a solution phase or slurry phase catalyst in the reaction solution. In this case, it is most convenient when the solvent used to dissolve the material propylene and the solvent used for forming the solution phase or slurry phase catalyst are the same.

Additionally, by incorporating in the reaction system at least one additive selected from the group consisting of formaldehyde, acetoaldehyde, propylaldehydes, acrolein, butylaldehydes, acetone, methanol, ethanol, propanols and butanols, the reaction speed and/or selectively can also be enhanced.

The ratio of the material propylene to oxygen varies also with the external operative conditions such as the catalyst, reaction temperature, gas velocity as well as pressure, etc., the reaction being operable over a very wide range of from oxygen in great excess to oxygen in minute quantities on the order of 1/1000 (volume), but from a standpoint of commercial scale operations a ratio on the order of 1:0.1–1:15 (volume) is advantageous. Preferably the oxygen is fed in increments. Furthermore, the mixed gas comprising propylene and oxygen can be diluted with other inert gases, in which case it is preferred from the standpoint of commercial scale operations that the concentration of the propylene be on the order of about 5 to 98% by volume. As to the oxidation reaction of propylene with the catalyst system of this invention, it is not necessarily clear at present as to whether this is due to the reaction of the propylene and oxygen which have been adsorbed on the silicon or tin catalyst of this invention or whether the reaction products of the aforesaid catalyst and the propylene or the oxygen intervenes as intermediates. The oxidation catalyst of the present invention, however, is one that has not been known hitherto, and it is to be understood that this invention is not to be limited in any manner whatsoever by such an inference of the reaction mechanism.

While in the past propylene oxide could not be obtained at all at normal atmospheric pressure by using propylene and oxygen, as such, or by passing them over a catalyst when the process of this invention is practiced, it is obtained very readily at a conversion rate on the order of 1% to 5%. Furthermore, when the liquid phase catalytic oxidation process is employed with the reaction conditions

TABLE I

| Ex. No. | Catalyst No. | Catalytic material | Carrier and temp. Reduced pressure | Amt. of catalyst used (g.) | Feed (mMol/hr.) | | Products (mMol/hr.) | | | | | | Reactor material | Reaction temp. (°C.) | Propylene oxide, percent | |
|---|---|---|---|---|---|---|---|---|---|---|---|---|---|---|---|---|
| | | | | | | | Gas Phase | | Liquid Phase | | | | | | Conversion rate | Yield |
| | | | | | $C_3H_6$ | $O_2$ | Propylene oxide | Acetaldehyde | Propylene oxide | Aldehydes | Acids | Esters | | | | |
| 1 | 1 | $(CH_3)_3SiCl$ | Silica glass | 10 | 85 | 12 | 1.8 | 4.2 | | | | | Q | 350 | | |
| 2 | 2 | $(CH_3)_2SiCl_2$ | do | 10 | 174 | 31 | 3.3 | 9.2 | 0.5 | 4 | | | Q | 350 | 2.2 | 8.2 |
| 3 | 3 | $(CH_3)_3SiCl_3$ | do | 10 | 161 | 29 | 2.7 | 7.0 | 0.4 | 5 | | | S | 360 | 1.8 | 7.0 |
| 4 | 4 | $(CH_3)_2SiCl_2$ | 1,100° C., silica gel | 10 | 174 | 31 | 1.4 | 5.2 | | | | | Q | 350 | | |
| 5 | 5 | $(CH_3)_2SiCl_2$ | Boro-silicate glass | 10 | 174 | 31 | 2.7 | 6.4 | | | | | Q | 350 | | |
| 6 | 6 | $(CH_3)_2SiCl_2$ | $TiO_2$ | 10 | 174 | 31 | 0.04 | 0.7 | | | | | Q | 350 | | |
| 7 | 7 | $(CH_3)_2SiCl_2$ | Quartz stand | 10 | 174 | 31 | 2.6 | 4.5 | | | | | Q | 350 | | |
| 8 | 8 | $(CH_3)_2SiCl_2$ | Porcelain | 10 | 174 | 31 | 2.5 | 2.9 | | | | | Q | 350 | | |
| 9 | 9 | $(CH_3)_2SiCl_2$ | Active carbon | 10 | 174 | 31 | 0 | 1.2 | | | | | Q | 250 | | |
| 10 | 10 | $(CH_3)_2SiCl_2$ | $Al_2O_3$ | 10 | 174 | 31 | 0.02 | Trace | | | | | Q | 300 | | |
| 11 | 11 | $(CH_3)_2SiCl_2$ | Rock crystal | 10 | 161 | 29 | 2.5 | 5.4 | 0.3 | 3.6 | 0.4 | 1.0 | S | 375 | 2.8 | 14.8 |
| 12 | 12 | $(CH_3)_2SiCl_2$ | 1,500° C., silica** | 5 | 161 | 29 | 2.7 | 5.2 | 0.9 | 7.0 | 0.5 | 3.8 | S | 375 | 3.6 | 16.4 |
| 13 | 13 | $(CH_3)_2SiCl_2$ | 600°, silica** | 5 | 161 | 29 | 2.0 | 4.0 | 0.5 | 4.3 | 0.5 | 1.9 | S | 375 | 2.5 | 13.2 |
| 14 | 14 | $(CH_3)_2SiCl_2$ | $10^{-3}$ mm. Hg, 600°, silica | 17 | 85 | 12 | 1.4 | 3.0 | 0.5 | 4.0 | 0.4 | 1.8 | S | 300 | 1.9 | 13.6 |
| 15 | 15 | $(C_6H_5)(CH_3)SiCl_2$ | Silica glass | 10 | 85 | 12 | 1.1 | 3.4 | | | | | Q | 310 | | |
| 16 | 16 | $(C_6H_5)(CH_3)SiCl_3$ | do | 3 | 85 | 12 | 1.4 | 3.9 | | | | | Q | 350 | | |
| 17 | 17 | Divinyl dichlorosilane | do | 2 | 174 | 31 | 1.2 | 4.6 | | | | | Q | 350 | | |
| 18 | 18 | Hydromethyl polysiloxane | | | | | 2.1 | 7.7 | | | | | | | | |
| 19 | 19 | Dimethyl polysiloxane | do | 3 | 85 | 12 | 1.1 | 1.6 | | | | | Q | 350 | | | a Temperature indicates the preheating temperature, while the pressure is the reduced pressure condition at the time of preheating, which in all cases was carried out for 2 hours.
** Prepared from ethyl silicate.
Q = Quartz.
S = Stainless steel.

of a temperature of 100° to 200° C. and application of pressure, propylene oxide can be obtained at a conversion rate of about 4%. In this instance, its selectivity is of the order of 50%. Furthermore, it is also an important feature of this invention that the products consist of chiefly propylene oxide, acetoaldehyde and acrolein, which are materials of commercial importance, and that the production of by-products such as carbon oxides, formaldehyde, etc., is relatively insignificant.

The following examples are given for a clearer understanding of the invention. It is to be understood, however, that these examples are not in limitation of the invention and that many modifications and changes are possible without departing from the scope of the invention as defined in the appended claims.

Examples 1-19

In 100 ml. of benzene was dissolved 1 gram of the catalytic material indicated in Table I, following which 20 grams of the carrier material of 8-12 mesh shown in the table was impregnated therewith. After separation of the impregnated carrier, it was heated for 1 hour at 150° C. whereby the catalyst was obtained.

To a reactor of 50 ml. capacity packed with 10 grams of the above catalyst were fed under normal atmospheric pressure propylene and oxygen at the rates of 170 and 30 millimoles per hour or 85 and 15 millimoles per hour while heating to 250–450° C. The gas evolved was cooled to room temperature and after separating the liquid product the gas was passed through ethyl alcohol to absorb the gaseous product therein. When the propylene oxide, acetoaldehyde, acrolein, acids and esters contained in the liquid product and ethyl alcohol absorption liquid were quantitatively analyzed, the results were as shown in Table I.

diphenyl dichlorosilane was used as the catalyst. 10 grams of this catalyst was charged to a quartz reactor of 50 ml. capacity, and then at 300° C. propylene and oxygen were fed under normal atmospheric pressure at the rates of respectively 82 and 16 millimoles per hour, after which the gas evolved was cooled to room temperature. When analyzed as in Example 1, the production of propylene oxide was at 1.2 millimoles per hour and that of acetoaldehyde was 1.6 millimoles per hour. The conversion to propylene oxide was at the rate of 1.5% while that to acetoaldehyde was at 2.0%. The yield on the basis of propylene consumed was 6% in case of propylene oxide and 8.2% in the case of acetoaldehyde.

Examples 21-30

500 grams of previously purified ethyl silicate, 200 ml. of distilled water and 10 ml. of acetic acid were heated at reflux. After gelation, hydrolysis was effected by further adding of sufficient distilled water. The silica obtained after thorough washing, drying at 120° C. and pulverization to a powder of 10–12 mesh was used as catalyst No. E-1. Silica prepared in a similar manner but whose hydrolysis was incomplete was used as catalyst No. E-2. On the other hand, silica obtained by removing NaCl from ortho sodium silicate with hydrochloric acid was used as catalyst No. E-3. The foregoing catalysts, after receiving the treatments as indicated in Table II, were charged in amounts ranging from 3 to 10 grams to a stainless steel reactor of 50 ml. capacity, and then at 375° C. propylene and oxygen were fed thereinto under normal atmospheric pressure at the rates respectively of 161 and 29 millimoles per hour. The results were as shown in Table II, below.

TABLE II

| Ex. | Catalyst | | | Products (mMol/hr.) | | | | | | Propylene Oxide (Percent) | |
|---|---|---|---|---|---|---|---|---|---|---|---|
| | No. | Treatment conditions | Amount used (g.) | Gas Phase | | Liquid Phase | | | | Conversion Rate | Yield |
| | | | | Propylene oxide | Aceto-aldehyde | Propylene oxide | Aldehydes | Acids | Esters | | |
| Cont. 1 | E-1a | 400° C. preheating | 10 | 0 | 0 | 0 | 0 | 0 | | | |
| Cont. 2 | E-1b | 1,000° C. preheating | 10 | 0 | 0 | 0 | 0 | 0 | 0 | | |
| Ex. 21 | E-2a | None | 5 | 2.1 | 4.4 | 0.8 | 3.4 | 1.5 | 0.4 | 1.8 | 6.2 |
| Ex. 22 | E-2b | 400° C. preheating | 5 | 2.5 | 0.6 | 0.5 | 3.2 | 2.2 | 0.4 | 1.9 | 10.0 |
| Cont. 3 | E-2c | 600° C. preheating | 5 | 0 | 0 | 0 | 0 | 0 | 0 | 0 | 0 |
| Ex. 23 | E-2d | 10⁻⁵ mm. Hg* | 4 | 1.7 | 3.1 | 0.7 | 2.9 | 2.2 | 0.6 | 1.5 | 15.0 |
| Cont. 4 | E-2e | 1,000° C. preheating | 5 | 0 | 0 | 0 | 0 | 0 | 0 | | |
| Cont. 5 | E-3a | do | 5 | 0 | 0 | 0 | 0 | 0 | 0 | | |

Preheating in all cases was for 2 hours, except the (*) indicated, which was 5 hours. The "a-e" suffixed to the catalyst number are reference characters of treatment given.

Example 20

Diphenyl polysiloxane obtained by dehydrating and condensing diphenyl silanol obtained by the hydrolysis of Except that instead of ethyl silicate, other silicates were used, Examples 24 to 30 were carried out following the same procedures as in Example 22, whereby were obtained the results as set forth in Table III, below.

TABLE III

| Ex. | No. | Catalyst | | | Products (mMol/hr.) | | | | Propylene oxide (percent) | |
|---|---|---|---|---|---|---|---|---|---|---|
| | | Class | Treatment conditions | Amount used (g.) | Gas Phase | | Liquid Phase | | Conversion Rate | Yield |
| | | | | | Propylene oxide | Acetoal-dehyde | Propylene oxide | Alde-hydes | | |
| 24 | E-4 | N-propyl silicate | 400° C. preheating | 5 | 1.6 | 3.8 | 3.0 | 6.5 | 2.3 | 29.6 |
| 25 | E-5 | N-butyl silicate | do | 5 | 1.3 | 4.5 | 0.4 | 5.0 | | 8.8 |
| 26 | E-6 | Propylene glycol orthosilicate | do | 5 | 2.3 | 2.0 | 2.0 | 4.7 | 2.2 | 27.0 |
| 27 | E-7 | i-Propyl silicate | do | 5 | 0.8 | | 1.0 | | | |
| 28 | E-8 | Benzyl silicate | do | 5 | 1.7 | | 1.0 | | | 22.2 |
| 29 | E-9 | Allyl silicate | do | 5 | 1.4 | 2.1 | 1.3 | | | 18.8 |
| 30 | E-10 | Methyl silicate | 200° C. preheating | 5 | 0.5 | 0.2 | | | | |

Treatment was for 2 hours in all cases.

Example 31

An autoclave of 108 ml. capacity was charged with 25 grams of catalyst No. 2 of Example 2, 20 ml. of benzene and 268 millimoles of propylene. Oxygen was then introduced under pressure until a pressure of 17 kg./cm.² was reached, followed by carrying out the reaction by heating for 30 minutes at 150° C., with a consequence that the following products were obtained.

| | Millimoles |
|---|---|
| Propylene oxide | 10.3 |
| Propylene glycol | 4.7 |
| Organic acids | 7.7 |
| Esters | 7.7 |
| Acetoaldehyde | 2.4 |
| Methanol | 1.7 |
| Acrolein | 1.6 |
| Carbon oxides | 12.4 |

The conversion rate to propylene oxide and glycol was 5.6% and the total yield of oxide and glycol, based on the propylene consumed, was 40%.

What is claimed is:

1. A process for producing propylene oxide which comprises directly oxidizing propylene at a temperature of from 200° to 800° C. by contacting a mixed gas comprising at least propylene and oxygen in the presence of a catalyst of the formula:

$$R_n\text{—Si—}X_{4-n}$$

wherein $n$ is a positive integer from 0 to 4;
R is at least one member selected from the group consisting of alkyl, alkoxy, phenyl, and alkenyl; and
X is halogen.

2. The process of claim 1 wherein said catalyst is supported on a solid carrier.

3. A process for producing propylene oxide which comprises directly oxidizing propylene at a temperature of from 200° to 800° C. by contacting a mixed gas comprising at least propylene and oxygen in the presence of a catalyst, said catalyst being selected from the condensation polymerization product and partially hydrolytic condensation polymerization product of a polymerizable compound of the formula:

$$R_n\text{—Si—}X_{4-n}$$

wherein $n$ is a positive integer from 0 to 4;
R is at least one member selected from the group consisting of alkyl, alkoxy, phenyl and alkenyl; and
X is halogen, said polymerizable compound containing at least two members selected from alkoxy and halogen.

4. The process of claim 3 wherein said catalyst is supported on a solid carrier.

References Cited

UNITED STATES PATENTS

| | | | |
|---|---|---|---|
| 1,995,991 | 3/1935 | Lenher | 260—348.5 |
| 2,194,602 | 3/1940 | Law | 260—348.5 |
| 2,270,780 | 1/1942 | Berl | 260—348.5 |
| 2,279,469 | 4/1942 | Law | 260—348.5 |
| 2,307,421 | 1/1943 | Overhoff | 252—476 |
| 2,356,476 | 8/1944 | Shappirio. | |
| 2,530,509 | 11/1950 | Cook | 260—348.5 |
| 2,780,634 | 2/1957 | Robertson | 260—348.5 |
| 2,785,186 | 3/1957 | Landau | 260—348.5 |
| 2,936,291 | 5/1960 | Peters et al. | 252—431 |
| 2,983,690 | 5/1961 | Bertoldcini | 252—463 X |
| 2,985,668 | 5/1961 | Shinger | 260—348.5 |
| 2,999,074 | 9/1961 | Bloch et al. | 252—441 |
| 3,002,910 | 10/1961 | Caffrey | 252—472 |
| 3,024,253 | 3/1962 | Saffer | 260—348.5 |
| 3,074,880 | 1/1963 | Domash et al. | 252—466 X |

FOREIGN PATENTS

| | | |
|---|---|---|
| 453,326 | 12/1948 | Canada. |
| 494,219 | 7/1953 | Canada. |
| 490,123 | 8/1938 | Great Britain. |
| 675,481 | 7/1952 | Great Britain. |
| 676,358 | 7/1952 | Great Britain. |
| 819,848 | 9/1959 | Great Britain. |
| 855,091 | 11/1960 | Great Britain. |

JOHN D. RANDOLPH, *Primary Examiner.*

NICHOLAS RIZZO, WALTER A. MODANCE,
*Examiners.*

J. P. FRIEDENSON, N. S. MILESTONE,
*Assistant Examiners.*